Aug. 12, 1924.

C. OTTO

VERTICAL CHAMBER OVEN

Filed Feb. 6, 1922

1,504,492

2 Sheets-Sheet 1

Section A-B

Section C-D  E-F  G-H

Section J-K

Section L-M

Inventor
Carl Otto
by N. J. Bissing
atty.

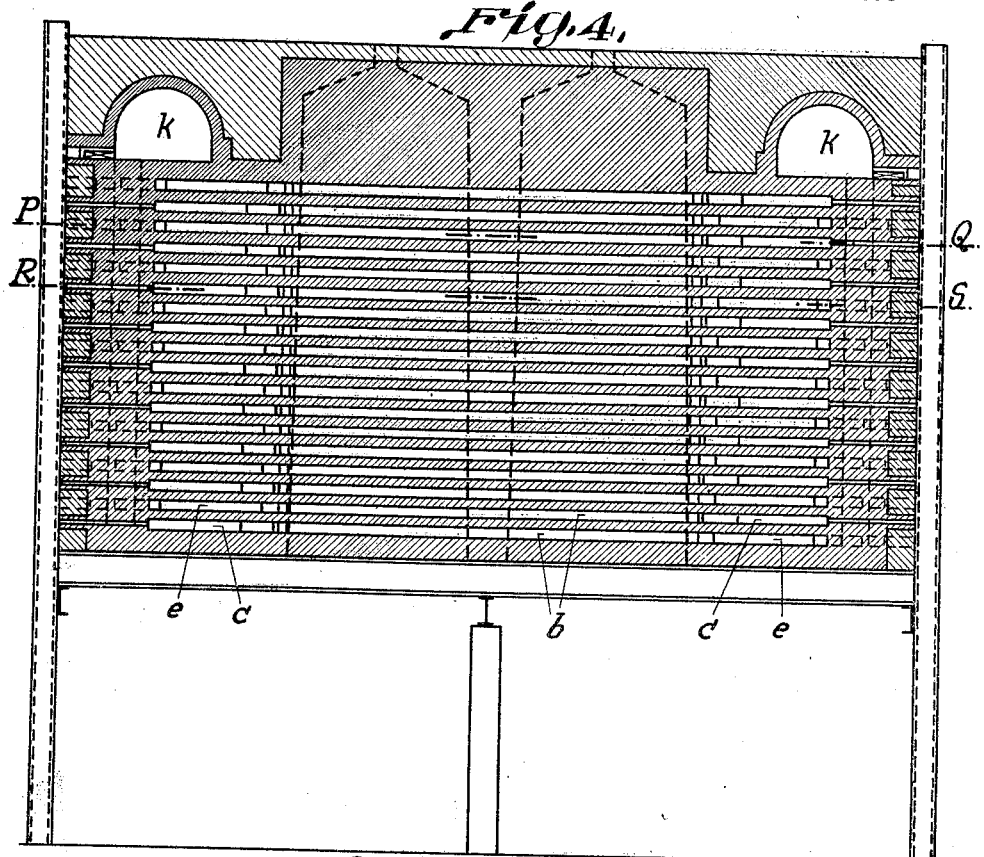
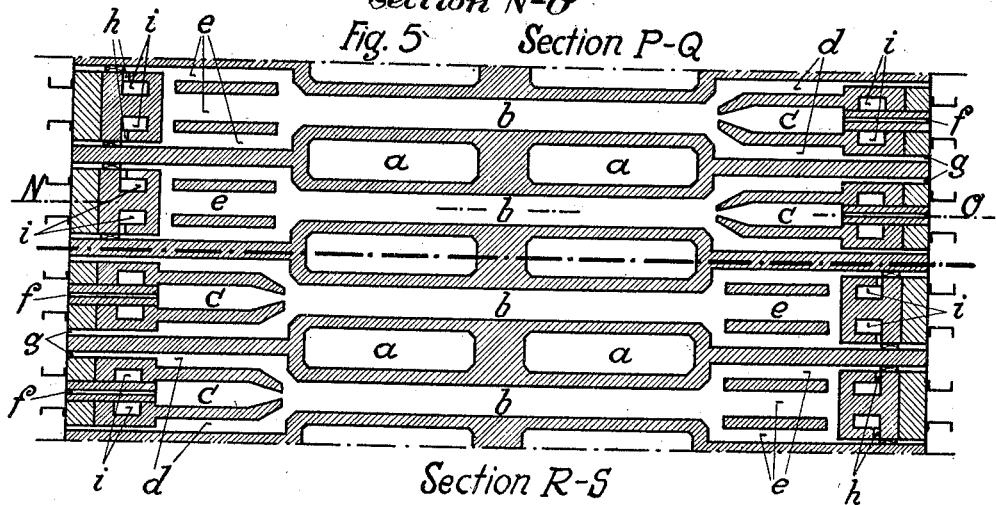

Patented Aug. 12, 1924.

1,504,492

UNITED STATES PATENT OFFICE.

CARL OTTO, OF COPENHAGEN, DENMARK.

VERTICAL-CHAMBER OVEN.

Application filed February 6, 1922. Serial No. 534,627.

*To all whom it may concern:*

Be it known that I, CARL OTTO, a citizen of the Republic of Germany, residing at Copenhagen, Kingdom of Denmark, Nr. 19 Vangehuisvej, have invented certain new and useful Improvements in the Construction of Vertical-Chamber Ovens, of which the following is a specification, reference being made to the accompanying drawings.

Figure 1:
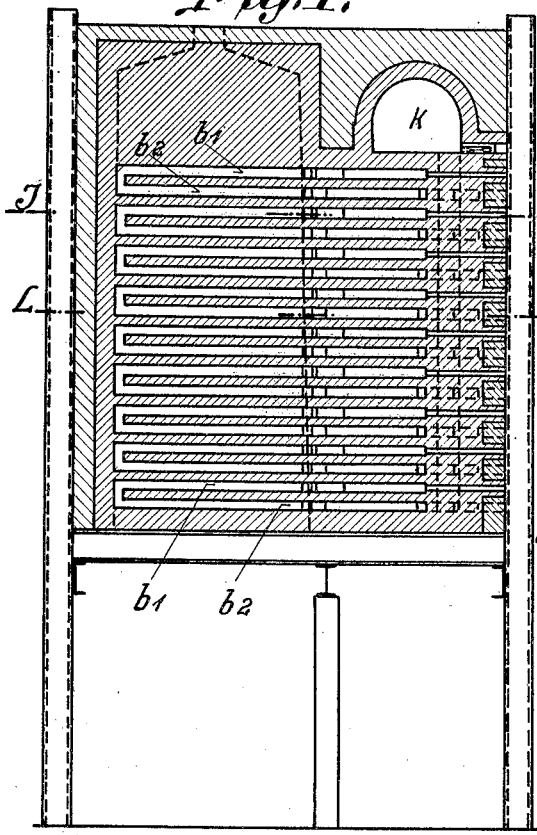
Figure 2:
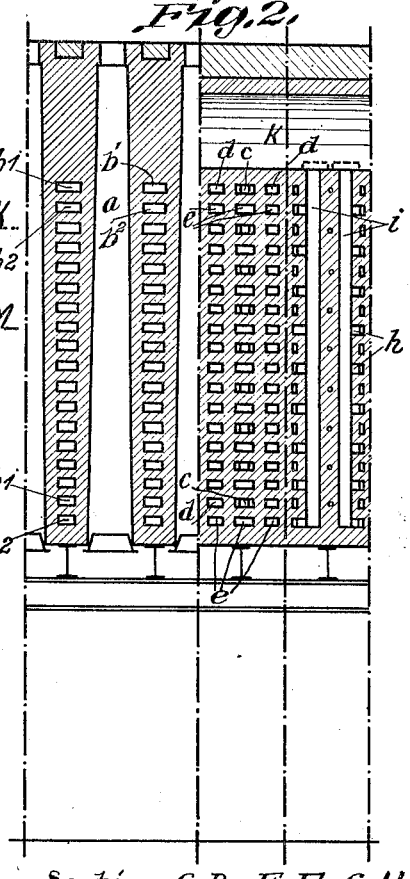
Figure 3:
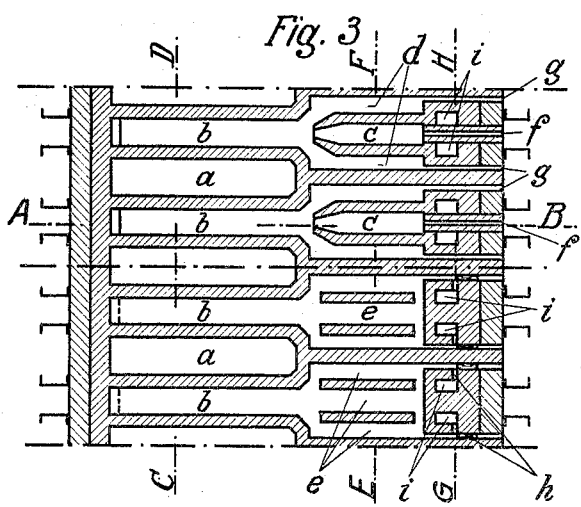

The invention refers to vertical chamber ovens with horizontal heating flues and particularly to those in which both gas and air are preheated by the waste heat of the ovens in so-called recuperators—i. e. two chambered preheaters. The preheating chambers are arranged in the prolongation of the horizontal heating flues in advance of the narrow sides of the oven-chambers in such a way, that the heating flues, of which one is placed above the other, are alternately connected with a preheating chamber of two compartments for air and gas, and one chamber for the waste heat. In the drawings I have shown the invention first in connection with single vertical ovens and secondly with double vertical ovens. With single ovens all the burners and recuperators are preferably placed on one of the narrow sides of the oven-chamber, while with the double ovens both narrow sides are used for this purpose. In all cases the flow of the heating gases in alternate heating flues, the one lying above the other, passes in opposite directions. The invention is shown in the drawings Sheets I and II in Figs. 1, 2 and 3 for single ovens and in Figs. 4 and 5 for double ovens, in which $a$ are the vertical oven chambers with the heating flues $b$ placed between them. In Figs. 1, 2 and 3 each heating flue consists of two branches i. e. of the directly fired flue $b_1$ and the returning flue $b_2$. Each flue $b_1$ connects at its front end with a burner having a preheating chamber $c$ for gas and a preheating chamber $d$ for air; each flue $b_2$ connects with a waste heat chamber $e$, which preferably is divided into several compartments. The heating gas, either producer gas or coke oven gas, is introduced into the heating chambers $c$ through adjustable pipes $f$ and the air for combustion into the heating chambers $d$ through adjustable openings $g$, both gas and air are heated through the partition walls between gas and air chambers $c$ and $d$ on one side and waste heat chambers $e$ on the other side, With double ovens the flues $b_1$ and $b_2$ form one straight flue and stretch along the whole length on the long sides of the ovens. At one end of the flues are arranged the gas- and air-preheating chamber, at the other end the waste heat chamber. For each two superposed flues the location of the chambers is interchanged and the air- and gas-preheating chambers are always located between two waste heat chambers. In both single and double ovens the heating flues are thus alternately connected in the vertical direction to an air and gas preheating chamber and to a waste heat chamber.

In all cases the waste heat from the waste heat chambers is led through openings $h$ and flues $i$ to the stackflue $k$. It will also be observed that the waste heat chambers are arranged in a plurality of stories and that the preheating chambers are arranged in a plurality of intermediate stories.

The very simple construction and easy accessibility of all parts of the new system allows an exact and easy regulation in all parts of the oven, and in consequence of the short and straight running of all the flues, very little resistance is to overcome and leakages between gas and air and waste heat are avoided.

Claims:

1. In a vertical chamber oven having a plurality of vertical oven chambers arranged in a row, the combination with said oven chambers of a horizontal flue heating system, said heating system comprising a series of superposed horizontal heating flues, the inlet end of each heating flue being connected with a preheating chamber for gas and air and the outlet end of each flue with a waste heat chamber, the waste heat chambers and the preheating chambers forming recuperators and being arranged alternately one above the other, so that the preheating chambers lie between the waste heat chambers, receiving heat from the latter.

2. In vertical chamber ovens having a plurality of vertical oven chambers arranged in a row each two chambers being separated by a heating wall common to the two chambers, a series of superposed adjacent horizontal heating flues in each heating wall, the inlet end of each heating flue being connected with a preheating chamber for gas and air and the outlet end of each flue with a waste heat chamber, the waste heat chambers and the preheating chambers forming recuperators and being arranged to extend in the direction of the heating flues and adjacent to each other so that the preheating chambers lie adjacent to the waste heat chambers receiving heat from the latter.

3. In a vertical chamber oven having a plurality of vertical oven chambers arranged in a row, the combination with said oven chambers of a horizontal flue heating system, said heating system comprising a series of superposed, adjacent horizontal heating flues, the inlet end of each heating flue being connected with a preheating chamber for gas and air and the outlet end of each flue with a waste heat chamber, the waste heat chambers and the preheating chambers forming recuperators and being arranged to extend in the direction of the heating flues and adjacent to each other so that the preheating chambers lie adjacent to the waste heat chambers receiving heat from the latter.

4. In vertical chamber ovens, the combination with a plurality of vertical oven chambers arranged in a row, of a series of superposed horizontal heating flues, the inlet end of each heating flue being connected with a preheating chamber for air and the outlet end of each flue with a waste heat chamber, the waste heat chambers and the preheating chambers forming recuperators and being arranged as axial extensions of the heating flues adjacent to each other so that the pre-heating chambers for the air lie adjacent to the waste heat chambers, receiving heat from the latter.

5. Vertical chamber ovens with horizontal heating flues and recuperators for the preheating of combustion air and heating gas, characterized by the air and gas preheating chambers and the waste heat chambers of the recuperators being arranged as axial extensions of the horizontal heating flues and by the heating flues being alternately connected in the vertical direction to an air and gas preheating chamber and a waste heat chamber, said flues and air, gas and waste heat chambers being so arranged that the flow of the heating gases in alternate heating flues the one lying above the other, passes in opposite directions.

6. In a vertical chamber oven having a plurality of vertical oven chambers arranged in a row, the combination with said oven chambers of a horizontal flue heating system, said heating system comprising a series of superposed horizontal heating flues, both ends of the heating flues being located at the same side of the oven, and one end connected with recuperator chambers for gas and air and the other end with a waste heat chamber, adjacent to the recuperator chamber, the waste heat chambers and the preheating chambers forming recuperators and being arranged as axial extensions of the heating flues adjacent to each other so that the preheating chambers lie adjacent to the waste heat chambers receiving heat from the latter.

7. In a vertical chamber oven comprising a plurality of vertical oven chambers arranged in a row each two chambers being separated by a heating wall common to the two chambers, a series of superposed horizontal heating flues in each heating wall, both ends of the heating flues being located at the same side of the oven and one end connected with recuperator chambers for gas and air and the other end with a waste heat chamber, adjacent to the recuperator chambers, the waste heat chambers and the preheating chambers forming recuperators and being arranged as axial extensions of the heating flues adjacent to each other so that the preheating chambers lie adjacent to the waste heat chambers receiving heat from the latter.

8. In vertical chamber ovens having a plurality of vertical oven chambers arranged in a row, the combination of a series of superposed horizontal heating flues, each flue consisting of two superposed branch flues combined to form a heating system, the direct branch being connected at its front end with a preheating chamber for gas and air and the return branch at its delivery end with a waste heat chamber, said preheating chambers and waste heat chambers forming recuperators and being arranged as axial extensions of the heating flues adjacent to each other so that the preheating chambers lie adjacent to the waste heat chambers receiving heat from the latter.

9. In vertical chamber ovens comprising in combination a plurality of vertical oven chambers arranged in a row, a plurality of heating walls, a series of superposed horizontal heating flues in each heating wall, a plurality of oven burners, one for each heating flue, said burners being adjacent to the oven chambers, each of said burners provided with a preheating air chamber and a preheating gas chamber, a waste heat chamber connected to the outlet of each flue, said waste heat chamber and the preheating chambers being arranged alternately one above the other, so that preheating chambers lie between waste heat chambers, receiving heat from the latter.

10. In vertical chamber ovens comprising in combination a plurality of vertical oven chambers arranged in a row, a plurality of heating walls, a series of superposed horizontal heating flues in each heating wall, a plurality of oven burners, adjacent to the oven chambers, each of said burners having a preheating air chamber, a plurality of waste heat chambers, one connected to the outlet of each flue, said preheating chambers and waste heat chambers being arranged alternately one above the other, so that the preheating chambers lie between the waste heat chambers, receiving heat from the latter.

11. In vertical chamber ovens comprising a plurality of vertical oven chambers arranged in a row, a series of superposed horizontal heating flues in each heating wall, the inlet end of each heating flue being connected with a preheating recuperator chamber for gas and air and the outlet end of each flue with a waste heat chamber forming part of the recuperator, the waste heat chambers being arranged in a plurality of stories and the preheating chambers being arranged in a plurality of intermediate stories, to extend in the direction of the heating flues, adjacent to each other so that the preheating chambers lie adjacent to the waste heat chambers receiving heat from the latter.

12. In vertical chamber ovens having vertical oven chambers, the combination of a series of superposed heating flues, each heating flue being connected at its front end with a preheating chamber for gas and air, the other end with a waste heat chamber, said preheating chamber and waste heat chamber forming part of a recuperator and being arranged as axial extensions of the heating flues, adjacent to each other so that the preheating chambers lie adjacent to the waste heat chambers receiving heat from the latter, a plurality of vertical waste heat flues connected with the waste heat chambers and a horizontal stack flue connected with said waste heat flues.

In testimony whereof, I have signed my name to this specification, in the presence of a witness.

CARL OTTO.

Witness:
A. CHRISTOPFERSEN.